United States Patent [19]

Zafiroglu

[11] Patent Number: 5,075,142

[45] Date of Patent: Dec. 24, 1991

[54] THERMOFORMABLE COMPOSITE SHEET

[75] Inventor: Dimitri P. Zafiroglu, Greenville, Del.

[73] Assignee: E. I. du Pont de Nemours and Company, Wilmington, Del.

[21] Appl. No.: 481,221

[22] Filed: Feb. 20, 1990

[51] Int. Cl.$^5$ ............................ B32B 1/00; B32B 5/04; B32B 27/02; B32B 27/12

[52] U.S. Cl. .................................. 428/36.1; 428/36.2; 428/102; 428/286; 428/288; 428/290

[58] Field of Search ...................... 428/36.1, 36.2, 102, 428/286, 288, 290

[56] References Cited

U.S. PATENT DOCUMENTS

| | | | |
|---|---|---|---|
| 4,298,643 | 11/1981 | Miyagawa et al. | 428/85 |
| 4,415,519 | 11/1983 | Strassel | 264/171 |
| 4,594,290 | 6/1986 | Fischer et al. | 428/212 |
| 4,704,321 | 11/1987 | Zafiroglu | 428/230 |
| 4,737,394 | 4/1988 | Zafiroglu | 428/102 |
| 4,773,238 | 9/1988 | Zafiroglu | 66/192 |
| 4,876,128 | 10/1989 | Zafiroglu | 428/102 |
| 4,897,297 | 1/1990 | Zafiroglu | 428/102 |

FOREIGN PATENT DOCUMENTS

| | | |
|---|---|---|
| 87103935.0 | 10/1987 | European Pat. Off. . |
| 63-162238 | 7/1985 | Japan . |
| 63-111050 | 5/1988 | Japan . |
| 2110990 | 6/1983 | United Kingdom . |

OTHER PUBLICATIONS

Lubin, "Handbook of Composites", Van Nostrand Reinhold Co., pp. 366–367 (1982).

*Primary Examiner*—James C. Cannon

[57] ABSTRACT

An improved thermoformable composite sheet comprises a layer of thermoplastic polymer and a lightweight stitchbonded nonwoven elastic fabric having a conformability at 180° C. in the range of 4 to 9. The sheet provides articles thermoformed therefrom with improved wall thickness uniformity.

7 Claims, 1 Drawing Sheet

THERMOFORMABLE COMPOSITE SHEET

BACKGROUND OF THE INVENTION

1. Field of the Invention

This invention relates to a composite sheet for use in thermoforming shaped articles. More particularly, the invention concerns such a composite sheet which comprises a layer of thermoplastic polymer and a specific stitchbonded nonwoven elastic fabric that can be thermoformed into more uniform, lighter weight objects than could have been thermoformed with the same layer of thermoplastic plastic, were the fabric layer omitted.

2. Description of the Prior Art

Conventional thermoforming processes are described by Lubin, "Handbook of Composites", Van Nostrand Reinhold Company, 1982, pages 366–367. Such thermoforming generally involves the sequential steps of (a) heating a thermoplastic sheet until it softens, (b) forming the softened sheet under the influence of gravity, pressure and/or vacuum in a mold and (c) allowing the formed sheet to cool and harden. When thermoforming is used to mold a sheet into a large article, such as the interior surface of a bathtub, a shower stall, sink, cooler, canoe hull, or the like, the thermoplastic sheet must undergo a large increase in area, often by a factor of three or more, along with a corresponding decrease in thickness. Depending on the area change and the design of the mold, among other things, there are often undesired thin spots in the molded article. During thermoforming, regions of the thermoplastic sheet subjected to large area changes or rapid contour changes, such as the corners and edges of the shaped article, often suffer from excessive and nonuniform thinning, which in turn leads to lower impact resistance, lower flexural strength and greater fragility. To compensate for such excessive, non-uniform thinning, the molder usually provides extra reinforcement to such regions by using a much thicker thermoplastic sheet for the thermoforming. This results in a heavier and more expensive molded article. Accordingly, it is an object of this invention to provide a thermoformable sheet material that will resist undesired thinning during such thermoforming molding operations.

Composite sheets comprising thermoplastic sheets laminated to other layers of plastic sheets or films are known for use in thermoforming processes. For example, U.S. Pat. No. 4,415,519 (Strassel), U.S. Pat. No. 4,594,290 (Fischer et al), European Patent Application 87103935.0 (Besozzi), and Japanese Patent Application Publication 63-111050 (Makihata) disclose such composite sheets. Composite sheets comprising a thermoplastic layer and a fabric, also are known for use in thermoforming, as for example from Japanese Patent Application Publication 63-162238 (Iwasaki), and U.S. Pat. No. 4,298,643 (Miyagawa et al). Miyagawa et al discloses the use of various types of yarns (e.g., textured, spandex, conventional) in a particular knitted fabric that is laminated to a thin thermoplastic sheet to form a composite sheet suitable for thermoforming.

Not related to thermoplastic molding is the present inventor's U.S. Pat. No. 4,773,238, which discloses an elastic stitchbonded nonwoven fabric that is useful as a dust cloth, industrial wipe, insulating fabric, and the like. An elastic stitching thread provides the fabric with certain elastic properties. Various elastic threads and substrate compositions are disclosed.

SUMMARY OF THE INVENTION

To alleviate the aforementioned problems associated with thermoforming of large thermoplastic articles, the present invention provides an improved thermoformable composite sheet of the type that has a layer of thermoplastic polymer adhered to a relatively lightweight fabric layer. The improvement comprises the fabric layer being a stitchbonded nonwoven elastic fabric which has a conformability (defined hereinafter) at 180° C. in the range of 4 to 9, preferably in the range of 5 to 7. The stitchbonded fabric usually amounts to no more than 20%, preferably in the range of 2.5 to 10%, of the total weight of the composite. The layers can be adhered to each other by an adhesive, thermal bonding or both. The preferred polymer for the thermoplastic layer is polymethylmethacrylate. In another preferred embodiment, each surface of the stitchbonded fabric is adhered to a thermoplastic polymer layer. The present invention also includes shaped articles made with the thermoformable composite sheets.

BRIEF DESCRIPTION OF THE DRAWINGS

The invention will be better understood by referring to the drawings, in which.

DETAILED DESCRIPTION OF PREFERRED EMBODIMENTS

Figure 1:
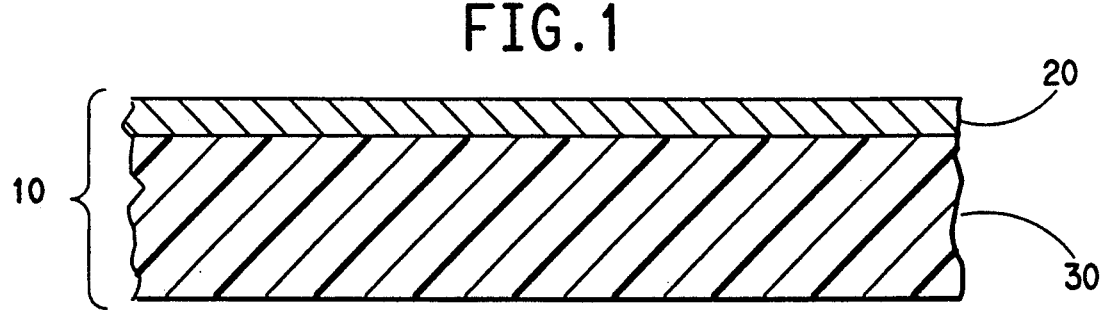
FIG. 1 is a cross-section of thermoformable composite sheet 10 of the invention in which stitchbonded nonwoven elastic fabric 20 is adhered to thermoplastic polymer layer 30.
Figure 2:
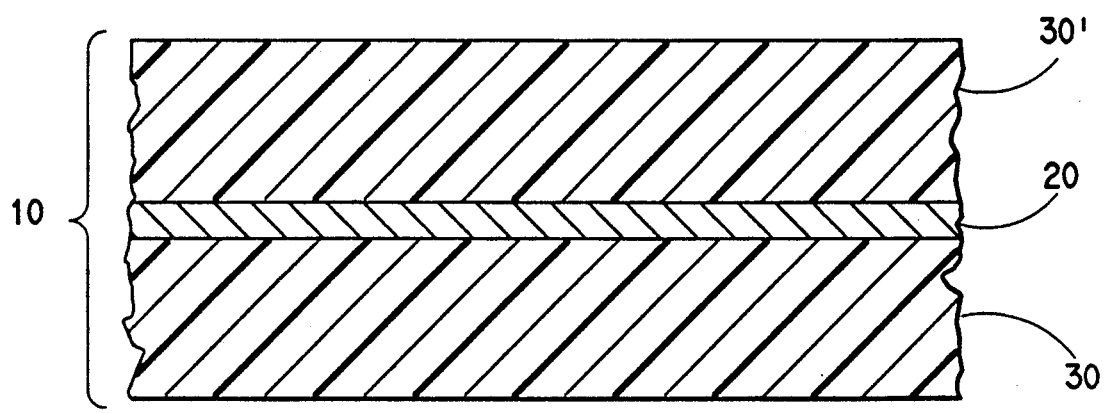
FIG. 2 is a cross-section of another thermoformable composite sheet 10' of the invention that has two thermoplastic polymer 30, 30' adhered to the lower and upper surfaces of stitchbonded nonwoven elastic fabric 20.

The improved thermoformable composite sheet of the invention has a layer of thermoplastic polymer adhered to a lightweight (i.e., relative to the thermoplastic layer) stitchbonded nonwoven elastic fabric. The composite is capable of being thermoformed by being heated to temperatures at which the thermoplastic polymer softens and then having pressure applied, as in compression molding or vacuum molding. With the application of stress during the thermoforming, the stitchbonded nonwoven elastic fabric conforms to the contours of the mold. The presence of the elastic fabric in the composite apparently decreases the nonuniform thinning that usually occurs in the thermoplastic layer when there is no elastic fabric present.

Conventional thermoplastic polymers are suitable for the polymer layer of the thermoformable composite sheet of the invention, provided the molding temperature of the polymer is also suitable for the stitchbonded nonwoven elastic fabric. Among suitable thermoplastic polymers are homopolymers and copolymers of methylmethacrylate, certain polyolefins, such as polyethylene and polypropylene, polyvinyl and polyvinylidene halides, ABS resins, polycarbonates, etc. Methylmethacrylate homopolymers and copolymers are preferred.

A temporary or permanent adhesive can be used to adhere the stitchbonded nonwoven elastic fabric to the thermoplastic polymer layer. For example, 68070 Tedlar ® adhesive (made by E. I. du Pont de Nemours and Company) is suitable. Alternatively, adhesion can be achieved by thermal bonding. The thermoplastic polymer layer and the stitchbonded fabric can be adhered to each other most economically immediately after the thermoplastic polymer has been cast or extruded into a sheet by bringing the fabric into firm contact with the sheet while the sheet is still hot.

The stitchbonded nonwoven elastic fabric of the thermoformable composite sheet of the invention can be selected from wide range of fibrous materials and a wide range of weights. Compared to the thermoplastic layer, the stitchbonded fabric is of very light weight. The fabric usually weighs in the range of 100 to 500 g/m$^2$ (3 to 15 oz/yd$_2$), preferably 120 to 240 g/m$^2$ (3.5 to 7 oz/yd$_2$). In contrast, the thermoplastic polymer layer can weigh 5 to 40 times as much as the fabric and is often as much as 30 times as thick.

The improved thermoformable composite sheet of the invention requires the stitchbonded nonwoven elastic fabric to have a Conformability, C, at 180° C. in the range of 4 to 9, preferably in the range of 5 to 7. The Conformability is measured as described hereinafter. Thermoforming operations often require the thermoplastic polymer layer to expand in area and reduce in thickness by factors of 2.5 to 4 or more. Stitchbonded nonwoven elastic fabric for use in the present invention can increase in area quite uniformly by a factor of 4 to 9. Also, as shown by thermoforming tests described in the Examples below, the stitchbonded fabric prevents excessive thinning of the thermoplastic layer in the usual problem regions at corners and edges of the shaped article. The examples also show that when the stitchbonded nonwoven elastic fabric has a Conformability at 180° C. outside the required 4 to 9 range, the resultant thermoformed article has inadequate thickness at its corners and edges. Several stitchbonded nonwoven elastic fabrics suitable for use in the present invention (i.e., those whose conformability factor at 180° C. measure in the range of 4 to 9) are disclosed in the present inventor's U.S. Pat. No. 4,773,238, which disclosure is incorporated herein by reference.

The stitchbonded nonwoven elastic fabric is much more conformable than the thermoplastic polymer layer at room temperature. At the temperatures of thermoforming, the stitchbonded nonwoven elastic fabric develops a much higher resistance to stretch and flow than does the thermoplastic sheet to which it is adhered. It is believed that this large resistance (compared to that of the thermoplastic polymer layer) causes the thermoplastic polymer layer to distribute itself more uniformly in the mold, thereby decreasing thinning in the resultant shaped article.

Various starting materials are suitable for preparing stitchbonded nonwoven elastic fabric of the thermoformable composite sheet of the invention. The starting materials usually are bulky, lightly bonded or non-bonded batts or webs of natural or synthetic organic fibers. Carded fiber batts, air-laid batts, lightly bonded spunbonded sheets, sheets of hydraulically entangled fibers, and the like are suitable. Preferably, the starting materials weigh less than about 50 g/m$^2$.

To form the fabric layer of the composite sheet of the invention, the above-described starting materials can be stitchbonded by conventional techniques with multi-needle stitching equipment, such as Arachne machines, Mali machines (e.g., Malino, Maliwatt and Malipol), Liba knitting machines and the like. Substantially any strong elastic thread is suitable for the stitching thread. However, if the elastic thread has a softening or melting point that is lower than the softening temperature of the thermoplastic polymer layer to which the elastic fabric is to be adhered, the thread should be present in the form of a covered or wrapped yarn. Suitable yarns include spandex or rubber filaments covered or wrapped with yarns of glass, aramid, nylon, polyester or the like. Then, even if the spandex or rubber softens or melts during thermoforming, the cover or wrap yarn persists and apparently provides the forces needed to decrease excessive thinning during thermoforming. Preferred stitching yarns are made of spandex filaments covered with nylon or polyester yarns. Stretch-textured nylon or polyester yarns also are suitable. Usually the stitching thread amounts to no more than 20% of the weight of the stitchbonded fabric, but preferably no more than 10%, most preferably 2 to 5%.

Many stitch patterns can be employed in the stitchbonding of the starting materials. Typically, a series of interlocked loops is formed in one surface of a staple fiber batt and a parallel series of zig-zag stitches is formed on the other surface. Alternatively, the stitching can form rows of chain stitches along the length of the batt. Chain stitching with elastic yarns can decrease the fabric length in the direction of the row of stitches and zig-zag stitches can decrease the width as well as the length of the fabric. Usually, the rows of stitches are inserted by needles which have a spacing in the range of 2 to 8 needles per cm and within each row, the stitches usually have a spacing of 1 to 7 per cm. Zig-Zag stitches are preferred. If the batt is stitched with elastic thread that is under tension, and the tension is then released, the fabric area becomes smaller (i.e., shrinks). Shrinking of the stitchbonded fabric can also be accomplished by heating, steaming or chemical treatment.

To be suitable for use in the thermoformable composite sheets of the invention, the stitchbonded nonwoven elastic fabric must have a Conformability at 180° C. in the range of 4 to 9. Within this range, the Conformability of the stitchbonded fabric is sufficiently large to accomodate the usual area increase required of the thermoplastic layer during the thermoforming step. Also, even though the composite sheets of the invention significantly improve the thickness uniformity of thermoplastic polymer in the finished shaped article, considerable thickness variation can still be present. Accordingly, for use in making composite sheet of the invention, a good rule of thumb is to select a stitchbonded nonwoven elastic fabric that has a Conformability equal to at least one-and-a-half times the average area increase expected in conforming the composite sheet to the mold.

Conformability, C, of a fabric is measured in accordance with the following procedure. A sample of the is mounted flat in a 20.3-cm (8-inch) diameter ring that weighs 11.4 kilograms (25 pounds). A 5.1-cm (2-inch) diameter circle is marked in the center of the top surface of the fabric. A smooth metal sphere of 15.3-cm (6-inch) diameter is dusted with talc (to avoid sticking of fabric to the sphere). The fabric, held in the ring, is centered atop the sphere. The weight of the ring is supported by the fabric atop the sphere. The thusly weighted fabric assembly is placed in a hot air oven and heated at 180° C. for five minutes during which time the fabric expands to conform, at least in part, to the spherical surface. After the fabric is removed from the oven and allowed to cool, the fabric is removed from the ring and the expanded diameter, D, of the originally marked circle is re-measured. The new diameter results from the expansion caused by the heating and the stress imposed by the weight of the ring. The Conformability at 180° C. is then calculated by the formula $$C = D^2 + 5.1^2 = 0.0384 D^2$$

By repeating this procedure, but with the heating step omitted, the room temperature (i.e., 20° C.) Conformability is measured.

Figure 3:
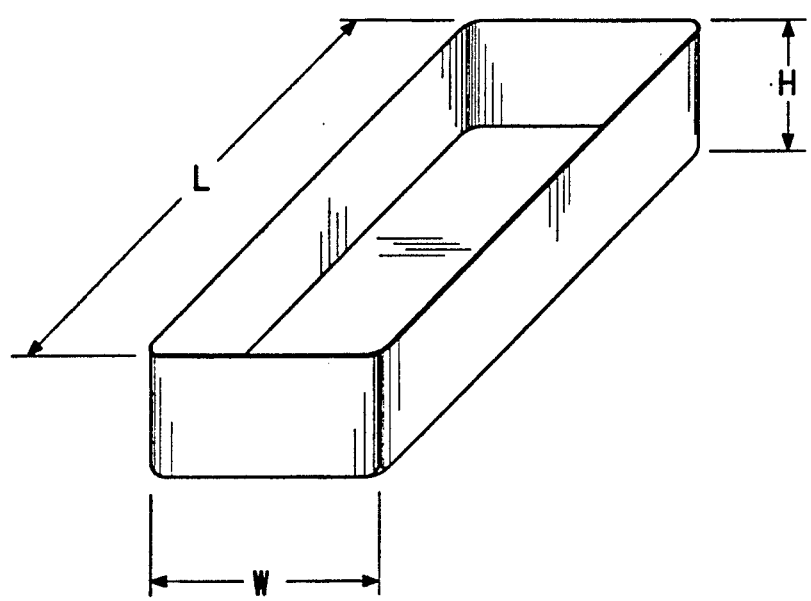
FIG. 3 is a schematic representation of a mold used in the Examples below for thermoforming composite sheets into shaped articles.

Expansion Factor, E, is a dimensionless parameter used to characterize each of the molds (See FIG. 3) employed in the Examples below. The factor is defined as the area increase that ideally would be required if a flat thermoplastic sheet were to conform to the mold walls while undergoing a uniform change in sheet thickness. The factor E is calculated by the formula $$E = (LW + 2LH + 2WH)/LW.$$

where L, H and W are defined in the table above and shown in FIG. 3. The internal dimensions and expansion factor of each mold are summarized in the following table.

TABLE 1

| Mold Number | Mold Dimensions in Centimeters | | |
|---|---|---|---|
| | I | II | III |
| Length, L | 28 | 28 | 132 |
| Width, W | 22 | 22 | 72 |
| Height, H | 13 | 15 | 61 |
| Radii | 1.9 | 1.9 | 3.8 |
| Expansion Factor, E | 3.09 | 3.50 | 3.64 |

Note that the listed radii are for the fillets at all intersections of walls and of walls with the bottom of the mold. An outlet of about 0.5-cm diameter is located in the bottom of each mold through which vacuum is applied.

Wall thicknesses reported in the Examples below are for the thermoplastic layers only; fabric thickness is not included. Thicknesses are measured at "critical" regions of the thermoformed part with an ultrasonic thickness tester, sold by Branson Co. "Critical" regions are those wherein excessive thinning of the thermoplastic polymer usually is difficult to avoid. The reported thicknesses are averages measured (a) at the four bottom corners, (b) at the midpoints of the long and short bottom edges and (c) at the middle of the bottom face of the molded article. The "ideal" or desired thickness, $t_i$, is defined as the thickness, z, of the thermoplastic polymer layer before thermoforming divided by the expansion factor, E, of the mold. Thus, $t_i = z \div E$.

EXAMPLES

In each of the following examples, the fabrication of several stitchbonded nonwoven elastic fabrics is described. Each example describes (a) the preparation of a stitchbonded fabric and its measured Conformability, (b) adhering the fabric to one or more layers of polymethylmethacrylate (hereinafter "PMMA") to form a composite sheet, (c) heating the composite for 10 minutes at 180° C. and then thermoforming the composite under a vacuum of 51 cm of mercury in a test mold, (d) heating and thermoforming, under the same conditions, a comparison sample which is a PMMA sheet having no stitchbonded fabric adhered to it but being of the same dimensions as the PMMA layer in the composite, (e) measuring the thicknesses of the thusly thermoformed articles at their corners, edges and bottom. Mold I (See Table 1 above) was used in Example 1; Mold II, in Example 2; and Mold III, in Example 3.

In the Examples, fabrics in accordance with the invention are designated with Arabic numerals. Comparison samples, outside the invention are designated with upper case letters. All stitchbonded nonwoven fabric samples were prepared with a 14-gauge (14 needles per inch or per 2.54 centimeters in the cross-machine direction) two-bar Liba stitching machine, except Example 1, which employed a 12-gauge (12 needles/inch) two-bar Liba. Each machine inserted 11.5 stitches per inch in the machine direction. The inserted stitch patterns are identified with conventional warp-knitting nomenclature.

EXAMPLE 1

The clear superiority of a thermoformed article made with a composite sheet of the invention, having a layer of polymethylmethacrylate (PMMA) adhered to a stitchbonded nonwoven elastic fabric, is demonstrated by this example. The article (Sample 1) in accordance with the invention is compared to an article (Comparison A) thermoformed under the same conditions in the same mold from a PMMA sheet of the same dimensions and weight as the PMMA layer of the composite sheet.

The stitchbonded nonwoven elastic fabric of Sample 1 was prepared from a carded web of polyester staple fibers. The web was stitched with a textured yarn supplied to the first bar and a covered spandex yarn supplied to the second bar of the stitchbonding machine. A mixture of 75% by weight of 3.8-cm (1.5-inch) long, 1.7-decitex (1.5-denier) Type 54 Dacron ® polyester fiber and 25% of 7.6-cm (3-inch) long, 3.3-dtex (3-denier) Type 262 Dacron ® polyester copolymer binder fiber (both fibers are sold by E. I. du Pont de Nemours and Company) was single-pass carded on a Hergeth Card to form a batt weighing about 34 g/m² (1 oz/yd²). The batt was lightly cohered by conventional calendering on a Kusters unit at a temperature of 135° C. and a pressure of 689 kPa (100 psi) and then fed in the machine direction to the stitchbonding machine. The front bar of the Liba was supplied with wrapped yarn made with 22-dtex (20-denier) Type-126 Lycra ® spandex filament (sold by E. I. du Pont de Nemours and Company) and single-wrapped with a 44-dtex (40-den) 13-filament textured nylon yarn (sold by MacField Texturing Inc., Madison, N.C.) and formed 1-0,0-1 chain stitches. The back bar was supplied with a 44-dtex (40-den) 13-filament textured nylon yarn and formed 1-0,1-2 jersey stitches. The resulting stitchbonded fabric weighed 47.5 g/m² (1.4 oz/yd²).

A sample of the thusly prepared stitchbonded fabric was immersed in boiling water for 10 minutes. The fabric shrank to about 38% of its original length and 95% of its original width. The area of the shrunken fabric equaled about 36% of its original stitchbonded area. The resulting fabric had grab tensile elongations at break (ASTM D 1117) of about 230% in the machine direction of the fabric and about 70% in the transverse direction. The shrunken stitchbonded fabric weighed 132 g/m² (3.9 oz/yd²) and had a Conformability of 4.9 at room temperature and of 5.2 at 180° C. A sample of the shrunken fabric was adhered at 150° C. with G-8070 Tedlar ® adhesive to a 61-cm (24-inch) long, 41-cm (16-inch) wide, 3.4-mm (0.135-inch) thick, wine-colored Lucite® XL polymethylmethacrylate (PMMA) thermoplastic polymer. (Tedlar® and Lucite® are sold by E. I. du Pont de Nemours and Company). The resulting composite was 97.2% by weight PMMA layer and 2.8% by weight stitchbonded nonwoven elastic fabric, not counting the adhesive which weighed less than 6.8 g/m² (0.2 oz/yd²). In total, the composite weighed more than 4.7 kg/m² (10.4 lb/yd²).

The thusly prepared composite was heated in an oven at 180° C. for 10 minutes and then promptly vacuum molded in Mold No. I with the fabric surface of the composite facing the mold walls. A comparison article, Sample A, was thermoformed with a PMMA sheet of the same size as in the composite of Sample 1, but with no fabric adhered to it. Results are summarized in Table 2.

TABLE 2

| Thermoforming with Mold 1 (Expansion factor = 3.09) | | |
|---|---|---|
| | Example Sample 1 | Comparison Sample A |
| Stitchbonded Fabric | | |
| Weight, g/m² | 132 | none |
| % of Composite | 2.8 | 0 |
| Conformability | | |
| at 20° C. | 4.9 | — |
| at 180° C. | 5.2 | — |
| Thermoplastic Layer Thickness, mm | | |
| Ideal, $t_i$ | 1.14 | 1.14 |
| Corners | 0.71 | 0.36 |
| Edges | 0.97 | 0.51 |
| Mid bottom | 1.42 | 0.54 |

The ideal thickness, $t_i$, for the PMMA layer thermoformed in Mold I was 1.12 millimeters (0.044 inch). The thicknesses in the "critical" regions of corners, edges and mid bottom of thermoformed Comparison Sample A are respectively only 32, 45 and 47% of the desired ideal thickness. This represents highly excessive thinning of the thermoplastic PMMA layer in those regions. In contrast, the thicknesses in the same "critical" regions of thermoformed Sample 1 of the invention are 62, 85 and 125% of the ideal thickness. Thus, the composite of the invention with its stitchbonded nonwoven elastic fabric greatly decreased thinning of the walls in the critical regions of the thermoformed article.

EXAMPLE 2

This example demonstrates the importance of the conformability at 180° C. of the stitchbonded nonwoven elastic fabric layer of the thermoformable composite sheets of the invention. In this example, several stitchbonded fabric samples were prepared and each was adhered to a 3.18-mm (0.125-inch) thick layer of PMMA to form a composite. Two of the stitchbonded nonwoven elastic fabrics, Samples 2 and 3, were of the invention. The fabrics for Comparison Samples B, C and D were outside the invention because they had Conformabilities at 180° C. of 15.4, 3.3 and 3.7 respectively. Thermoforming of these composites in Mold No. II was also compared with the thermoforming of Comparison Sample E, which consisted of the PMMA layer with no fabric adhered to it. The advantages of thermoformable composite sheet in accordance with the invention is clearly shown by the results summarized in Table 3.

The stitchbonded fabrics used for these examples were prepared as follows:

Sample 2: Sontara® Type 8000 spunlaced (i.e., hydraulically entangled) web of 1.5-dtex (1.35l-den), 3.8-cm (1.5-inch) long polyester staple fibers (sold by E. I. du Pont de Nemours and Company) was stitchbonded on a two-bar, 14-gauge Liba machine. A single-wrapped Lycra® spandex yarn of the type described in Example 1 was used to form 1-0,0-1 chain stitches with the front bar and 1-0,2-3 "long float" jersey stitches with the back bar. The resulting stitchbonded fabric was subjected to a 10-minute boil-off followed by air drying which shrank the fabric in the machine direction to 70% of its original length and in the transverse direction to 40% of its original dimension. The shrunken fabric had grab elongations in the machine and transverse directions of 162% and 365% respectively.

Sample 3: A batt of 3.3-dtex (3-dpf) 7.6-cm (3-inch) long polyester staple fibers (Type 54 Dacron® sold by E. I. du Pont de Nemours and Company) was carded on a Hergeth card and cross-lapped to form a 102-g/m² (3-oz/yd²) web; needle-punched at 7.4 penetrations/cm² (48/in²) on a Dilo needler; and then stitchbonded, boiled off and dried in the same manner as used for Sample 2.

Comparison Sample B: A batt, made up 75% by weight of 1.7-dtex (1.5-den), 3.8-cm (1.5-inch) long Type 54 Dacron® and 25% of 3.3-dtex (3-den), 7.6-cm (3-inch) long Type 262 Dacron® polyester fibers (sold by E. I. du Pont de Nemours and Company) was carded on a Hergeth card form a 17-g/m² (0.5-oz/yd²) web which was bonded with a Kusters calender operating at 160° C., 689 kPa (100 psi) and 13.7 meters/in (15 yd/min). The web was stitchbonded with the same single-wrapped spandex yarn as was used for Sample 3. A simple tricot stitch was used on both bars. The fabric was then subjected to the same boiloff and drying as Sample 3 to shrink the fabric to 78% and 20% of its original transverse and machine direction dimensions.

Comparison Sample C: The procedure used to prepare Sample B was repeated except that a 102-g/m² (3-oz/yd²) carded web was used. Boil-off and drying shrank the fabric to 55% of its original area.

Comparison Sample D: A 102-g/m² (3-oz/yd²) cross-lapped carded batt was prepared on a Hergeth card from a blend of 3.3-dtex (3-den), 7.6-cm (3-inch) long staple fibers of which 75% was Type 126 nylon and 25% was Type 262 Dacron® polyester (sold by E. I. du Pont de Nemours and Company). After needle-punching as for Sample 2, the web was stitchbonded with a dual 160-dtex (140-den) textured nylon yarn on the front bar making tricot stitches and a single wrapped spandex yarn (as in Example 1) on the back bar making chain stitches. Boiloff and drying as for Samples B and C resulted in a shrinkage to 42% of its original area.

Each of Samples 2, 3, B, C and D was adhered to a separate sample of 3.2-mm (0.125-inch) thick of PMMA of the type employed in Example 1, to form a composite sheet for thermoforming tests. Thermoforming was performed in Mold II under the same conditions and in the same manner as for the samples of Example 1. Characteristics of the samples and results of the tests performed are summarized in Table 3, below.

TABLE 3

Thermoforming with Mold II (Expansion factor = 3.50)

|  | Of Invention | | Comparison Samples | | | |
|---|---|---|---|---|---|---|
|  | 2 | 3 | B | C | D | E |
| Stitchbonded Fabric | | | | | | |
| Weight, g/m² | 193 | 468 | 144 | 197 | 298 | none |
| % of Composite Conformability | 4.3 | 9.9 | 3.3 | 4.4 | 6.6 | — |
| at 20° C. | 5.6 | 6.3 | 15.4 | 3.3 | 3.7 | — |
| at 180° C. | 6.1 | 6.7 | 15.4 | 3.3 | 3.7 | — |
| PMMA Thickness, mm | | | | | | |
| Ideal, $t_1$ | 0.91 | 0.91 | 0.91 | 0.91 | 0.91 | 0.91 |
| Corners | 0.74 | 0.74 | 0.30 | ** | ** | 0.20 |
| Edges | 0.84 | 0.76 | 0.50 | ** | ** | 0.51 |
| Mid bottom | 0.94 | 1.24 | 0.68 | ** | ** | 0.53 |

Note: **indicates that the composite sample failed to conform to the mold during thermoforming.

As shown by the data in Table 3, all "critical" thicknesses at the corners, edges and bottom of the articles thermoformed from composite sheets of the invention, at their worst, were at least 74% of the ideal desired thickness. In contrast, Comparison Sample B, whose Conformability was well above the maximum of the present invention, failed at the corners of the thermoformed article. The corners were only 16% of the desired thickness. Edges of thermoformed Comparison Sample B were only 55% of the desired thickness. Comparison Sample B was very little better than Comparison Sample E, which had no fabric at all adhered to its PMMA sheet. Comparison Samples C and D, whose 180° C. Conformabilities were below the minimum of the present invention, failed in the thermoforming tests. The composites of Comparison Samples C and D apparently were too stiff at the forming temperatures to conform to the walls of the mold.

EXAMPLE 4

In this example the preparation of a stitchbonded nonwoven elastic fabric of the invention, its adhesion to a sheet of PMMA and the thermoforming of the resultant composite are identical to those described in the preparation of Sample 2 of Example 2, except that a much larger mold, Mold III, and thermoforming sheet to adequately cover the top of the mold were used. Mold III measured 132-cm long by 71-cm wide by 24-cm deep versus 29 by 20 by 15 cm of Mold II of Example 2. Comparison Sample F was made with no fabric adhering to the PMMA layer. The results which are summarized in Table 4 below. Note the important improvement in thickness achieved particularly in the corners and the edges of the articles thermoformed with the composite of the invention. The corners and edges of the shaped article of the invention were respectively 71 and 80% of the ideal thickness whereas the corresponding thicknesses of Comparative Sample F was only 42 and 59% of the desired thicknesses.

TABLE 4

Thermoforming with Mold III (Expansion factor = 3.64)

| Sample | Example 4 | Comparison F |
|---|---|---|
| Stitchbonded Fabric | | |
| Weight, g/m² | 193 | none |
| % of Composite Conformability | 4.3 | — |
| at 20° C. | 5.6 | — |
| at 180° C. | 6.1 | — |
| PMMA Thickness, mm | | |
| Ideal, $t_1$ | 0.86 | 0.86 |
| Corners | 0.61 | 0.36 |
| Edges | 0.71 | 0.51 |
| Mid bottom | 0.97 | 1.24 |

EXAMPLE 5

This example demonstrates the beneficial effects achieved with a composite sheet of the invention in which a stitchbonded nonwoven elastic fabric is embedded between two layers of PMMA, at the mid-plane of the composite. The preparation of Sample 2 and of Comparison Sample E of Example 2 was repeated, except that a second layer of PMMA identical to the first PMMA layer was adhered to the opposite side of the fabric for Sample 5, and to the other PMMA layer for Comparison Example G. The total thickness of thermoplastic polymer in each of these composites was 6.35 mm (0.250 inch). The results of the thermoforming tests are summarized in Table 5, below. In the critical regions of the corners and edges of the thermoformed articles in accordance with the invention, the thicknesses were no less than 78% of the ideal thickness. In contrast, the corner of the thermoformed article made with the comparison Sample G, was only 45% of the desired thickness.

TABLE 5

Fabric Sandwiched between Two PMMA Layers
Thermoforming with Mold II (Expansion factor = 3.50)

| Sample | Example 5 | Comparison G |
|---|---|---|
| Stitchbonded Fabric | | |
| Weight, g/m² | 193 | none |
| % of Composite Conformability | 2.2 | — |
| at 20° C. | 5.6 | — |
| at 180° C. | 6.1 | — |
| PMMA Thickness, mm | | |
| Ideal | 1.88 | 1.88 |
| Corners | 1.47 | 0.84 |
| Edges | 1.57 | 1.27 |
| Mid bottom | 1.98 | 2.16 |

EXAMPLE 6

This example illustrates the need for the stitching thread network of the stitchbonded nonwoven elastic fabric of the composite of the invention to maintain its integrity during thermoforming operations.

The preparation of Sample 2 of Example 2 was repeated, except that a bare 160-dtex (140-den) Lycra ® spandex yarn was used for the stitchbonding thread instead of a nylon-wrapped spandex thread. The stitchbonded fabric shrank in a very similar manner to the fabric of Sample 2, but the composite sheet performed inadequately when thermoformed. The results are summarized in Table 6. Sample H' has no fabric. Sample 2 is repeated in the table for comparison purposes.

Table 6 shows that the stitchbonded fabric of Comparison Sample H, with its bare Lycra ® could not survive the 180° C. Conformability test. The thermoforming tests showed that the fabric of Sample H provided no help in reducing thinning in the corners and edges of the molded article. The corners and edges were as thin as those of Comparison H', which contained had no fabric. In contrast, the composite of Sample 2 of the invention performed very well in reducing thinning in the corners and edges. The spandex filaments of the stitchbonded fabric of Sample 2 were wrapped with nylon, but those of Comparison H were bare.

TABLE 6

Comparison - Bare Spandex in Stitchbonded Fabric Thermoforming with Mold II (Expansion factor = 3.50)

| Samples | Comparisons | | Invention |
|---|---|---|---|
| | H | H' | Example 2 |
| Stitchbonded Fabric | | | |
| Weight, g/m² | 251 | none | 193 |
| % of Composite | 5.6 | — | 4.3 |
| Conformability | | | |
| at 20° C. | 6.0 | — | 5.6 |
| at 180° C. | failed | — | 6.1 |
| PMMA Thickness, mm | | | |
| Ideal, $t_i$ | 0.91 | 0.91 | 0.91 |
| Corners | 0.25 | 0.20 | 0.74 |
| Edges | 0.51 | 0.51 | 0.84 |
| Mid bottom | 1.02 | 0.53 | 0.94 |

The thermoformed article of Sample 2 was treated further to attach a rigid foam to its surface. The thermoformed sample was placed in a plywood box having an open top and internal dimensions that were about two inches (5 cm) bigger than the outside dimensions of the thermoformed article so that there was a clearance of about 1 inch (2.5 cm) between the outer surface of the article and the inside of the box. A urethane foam was injected between the clearance space between the box walls and fabric surface of the thermoformed article. After curing and removal of the article from the box, the foam was found to be permanently attached to the thermoformed article. The rigid foam provided additional strength and impact resistance to the article at a very small cost and very small increase in total weight.

I claim:

1. In a thermoformable composite sheet having a thermoplastic polymer layer which is adhered to a relatively lightweight fabric layer, the improvement comprising the fabric layer being a stitchbonded nonwoven elastic fabric having a conformability at 180° C. in the range of 4 to 9 and amounting to no more than 20% of the total composite sheet weight.

2. A thermoformable composite sheet according to claim 1 wherein the conformability is in the range of 5 to 7 and the fabric weight is in the range of 2.5 to 10%.

3. A thermoformable composite sheet according to claim 1 wherein the polymer layer and the stitchbonded fabric are adhered to each other by an adhesive.

4. A thermoformable composite sheet according to claim 1 having the opposite face of the stitchbonded fabric adhered to a second thermoplastic polymer layer.

5. A thermoformable composite sheet according to claim 1, 2, 3 or 4 wherein the thermoplastic polymer is a polymethylmethacrylate polymer.

6. A shaped article thermoformed from the composite sheet of claim 1, 2, 3 or 4.

7. A shaped article thermoformed from the composite sheet of claim 5.

* * * * *